United States Patent [19]

Le Lannou

[11] 4,418,115

[45] Nov. 29, 1983

[54] FRICTION LINING

[75] Inventor: Michel Le Lannou, Ermont, France

[73] Assignee: Valeo S.A., Paris, France

[21] Appl. No.: 296,231

[22] Filed: Aug. 25, 1981

[30] Foreign Application Priority Data

Sep. 4, 1980 [FR] France ............................. 80 19087

[51] Int. Cl.³ ............................................. F16D 69/02
[52] U.S. Cl. ............................... 428/283; 188/251 A; 192/107 M; 428/288; 428/359; 428/368; 523/156
[58] Field of Search ............... 428/283, 288, 359, 368; 188/251 A; 523/156; 192/107 M

[56] References Cited

U.S. PATENT DOCUMENTS

| | | | |
|---|---|---|---|
| 4,130,537 | 12/1978 | Bohrer ................................ | 523/156 |
| 4,175,070 | 11/1979 | Klein et al. . | |
| 4,187,209 | 2/1980 | Searfoss et al. . | |
| 4,197,223 | 4/1980 | Bartram ............................. | 523/156 |
| 4,217,255 | 8/1980 | Griffith .............................. | 523/156 |
| 4,259,397 | 3/1981 | Saita et al. .......................... | 428/288 |
| 4,320,823 | 3/1982 | Covaleski ........................... | 523/156 |

FOREIGN PATENT DOCUMENTS

| | | |
|---|---|---|
| 34258 | 8/1981 | European Pat. Off. . |
| 2516385 | 10/1975 | Fed. Rep. of Germany ...... 523/157 |
| 2418388 | 2/1979 | France . |
| 2430545 | 7/1979 | France . |
| 2000517 | 1/1979 | United Kingdom ................ 523/156 |
| 2013223 | 8/1979 | United Kingdom . |
| 2015024 | 9/1979 | United Kingdom . |

OTHER PUBLICATIONS

Moncrief, Man Made Fibers, Wiley Interscience Division–John Wiley and Sons Inc., New York, N.Y., (1970), pp. 131—132.

*Primary Examiner*—James C. Cannon
*Attorney, Agent, or Firm*—Young & Thompson

[57] ABSTRACT

The invention relates to a friction lining material, for use in brakes, clutches and other applications. The friction lining according to the invention contains mineral fibres, organic fibres, fillers and a binder. The organic fibres are at least partially composed of organic fibres of the crosslinkable fusible type, such as acrylic and/or modacrylic fibres. The lining formed in this way has excellent rubbing performance and wear resistance.

5 Claims, No Drawings

FRICTION LINING

BACKGROUND OF THE INVENTION

The present invention relates to a friction lining material for use in applications such as brakes and clutches, which is of the kind containing mineral fibres, organic fibres, fillers and a binder.

The fibres used can be presented in various forms, for example they may be free fibres, threads of continuous or discontinuous fibres, rovings, strands, mats, felts, fibrics and the like.

Hitherto, the organic fibres have generally been intended to improve the spinning conditions of the mineral fibres, that is to say for manufacturing reasons, rather than to improve the rubbing performance.

In fact, hitherto, the organic fibres have reputedly been more harmful than useful for the actual service of the lining. It is for this reason that they have generally been chosen in the form of cellulosic fibres, animal fibres, vegetable fibres or the like, that is to say in the form of an infusible type in which the fibre does not liquefy when the temperature of the lining rises during service, but decomposes without disturbing the rubbing conditions of the lining.

Infusible organic fibres of this type can have a moderating effect on the more or less aggressive action of the mineral fibres (and particularly glass fibres), on the counter-material, i.e. the material against which they are applied, for example the drum, disc, crown wheel, plate or the like, against which the lining is allowed to rub. However, these infusible organic fibres have the major disadvantage of reducing wear resistance of the lining itself.

The present invention provides a friction lining material, in particular for brakes, clutches and other applications, which is of the kind containing mineral fibres, organic fibres, fillers and a binder, which is free of these various disadvantages and in which the wear resistance of the lining is excellent.

SUMMARY

According to the invention, a friction lining containing mineral fibres, organic fibres, fillers and a binder is characterised in that the organic fibres are at least partially composed of organic fibres of the fusible type, such as polyester fibres, polyamide fibres, polypropylene fibres, acrylic fibres, modacrylic fibres and the like.

Tests have shown that, unexpectedly, a passivation phenomenon can take place, as a result of which, when the lining is exposed so as to rub on the counter-material, which an increase in the temperature, a protective crust is created on the surface of the lining and, by modifying the physical state of the fusible fibres, delays the melting of the latter at the location of this surface layer.

A copious liquid phase, which would detract from the rubbing conditions, is thus avoided in the region of the interface with the counter-material. On the other hand, in those layers of the lining which are furthest from the interface and which are therefore subjected to a lower temperature, the fusible organic fibres undergo substantial melting which does not detract from the rubbing, but which instead has the advantage of permitting compaction of the lining by filling the voids which can exist therein.

This results in an excellent wear resistance of the lining.

Thus, by virtue of the invention, the fusible organic fibres appear to have a useful role by increasing the wear resistance of the lining, rather than a harmful role as was thought hitherto.

However, as will be understood, fusible organic fibres should preferably be used with a few precautions, so that the lining can benefit from the above mentioned passivation phenomenon without risk.

In particular, according to the invention, the fusible organic fibres must be used in a limited amount in the lining and, according to another characteristic of the invention, the proportion by weight of the organic fibres of the fusible type in the friction lining is advantageously between 5% and 40%.

Moreover, the nature of the fusible organic fibres is chosen so that they melt to a limited extent with time and so that, in particular, they cease to melt shortly after they have begun, and, according to another characteristic of the invention, the organic fibres of the fusible type are chosen to be of the crosslinkable fusible type, for example acrylic and/or modacrylic fibres.

By virtue of this arrangement, the organic fibres of the crosslinkable fusible type are allowed, during service, and shortly after they have melted, to form a true network which defines a favourable rigid structure in the lining, without detracting from the rubbing conditions.

In one embodiment, all the orgaic fibres in the friction lining are organic fibres of the fusible type, whilst, as a variant, the organic fibres in the friction lining contain not only organic fibres of the fusible type, but also organic fibres of the infusible type, for example staple fibres.

According to the invention, the friction lining advantageously contains a proportion by weight of 5 to 30% of mineral fibres, 4 to 40% of organic fibres of the fusible type, 0 to 25% of organic fibres of the infusible type, 30 to 60% of fillers in the form of powder and/or thread, and 10 to 25% of binder. Preferably, the mineral fibres are glass and/or asbestos fibres, the organic fibres of the fusible type are acrylic and/or modacrylic fibres, the fillers totally or partially comprises sulphur, carbon black, graphite, barium sulphate, Meudon white, pyrites, zircon, copper and brass, and the binder totally or partially comprises resin and rubber.

Examples are given below without implying a limitation.

EXAMPLE I

Mineral fibres, organic fibres, fillers and a binder are used to form a friction lining suitable for brakes and clutches.

The fibres used can be presented in various forms, for example free fibres, threads of continuous or discontinuous fibres, rovings, strands, mats, felts, fabrics and the like.

The mineral fibres are glass fibres with a proportion by weight of between 5% and 30% and, in this example, of the order of 20%, in the friction lining. The organic fibres are organic fibres of the crosslinkable fusible type, consisting of acrylic fibres, with a proportion by weight of between 5% and 40% and, in this example, of the order of 5%, in the lining.

The acrylic fibres are, for example, fibres known commercially by the names: "ACRIBEL", "ACRI- LAN", "COURTELLE", "CRYLOR", "DRALON" and the like.

The fillers consist of sulphur, carbon black, graphite, barium sulphate, pyrites, copper and brass, in the form of powder and/or thread, with an overall proportion by weight of between 30 and 60% and, in this example, of the order of 55% in the lining.

The binder consists of resin and rubber with an overall proportion by weight of between 10% and 25% and, in this example, of the order of 10% in the lining.

More particularly, the friction lining according to this example has the composition given in Table I.

TABLE I

| Composition | % | Detail | % |
|---|---|---|---|
| Mineral fibres | 20 | Glass fibres | 20 |
| | | Asbestos fibres | 0 |
| Crosslinkable fusible organic fibres | 5 | Acrylic fibres | 5 |
| | | Modacrylic fibres | 0 |
| Infusible organic fibres | 0 | Staple fibres | 0 |
| Fillers | 55 | Sulphur | 5 |
| | | Carbon black | 5 |
| | | Graphite | 15 |
| | | Barium sulphate | 15 |
| | | Meudon white | 0 |
| | | Pyrites | 5 |
| | | Zircon | 0 |
| | | Copper | 10 |
| | | Brass | 0 |
| Binder | 20 | Resin | 10 |
| | | Rubber | 10 |
| | 100 | | 100 |

The lining formed in this way is manufactured in a customary manner by means of a thread consisting of the mineral fibres and the organic fibres, with impregnation by a cement consisting of the fillers and the binder, and then shaping into a slab, followed by baking under pressure.

The lining manufactured in this way has excellent rubbing performance. No disadvantage due to melting of the organic fibres of the crosslinkable fusible type is found, but instead an advantage in terms of the excellent wear resistance of the friction lining is found.

In particular, the wear resistance is considerably greater than that which is observed when the organic fibres of the fusible type are replaced by organic fibres of the infusible type.

Furthermore, although the mineral fibres consist of glass fibers, which are generally considered to be aggressive towards the counter-material, no damage of the counter-material during service is recorded.

EXAMPLE II

The procedure of Example I is followed, but the composition of the friction lining is that given in Table II.

The performance of this lining are analogous to those which have been described in Example I.

TABLE II

| Composition | % | Detail | % |
|---|---|---|---|
| Mineral fibres | 10 | Glass fibres | 10 |
| | | Asbestos fibres | 0 |
| Crosslinkable fusible organic fibres | 12 | Acrylic fibres | 0 |
| | | Modacrylic fibres | 12 |

TABLE II-continued

| Composition | % | Detail | % |
|---|---|---|---|
| Infusible organic fibres | 0 | Staple fibres | 0 |
| Fillers | 58 | Sulphur | 7 |
| | | Carbon black | 10 |
| | | Graphite | 10 |
| | | Barium sulphate | 8 |
| | | Meudon white | 8 |
| | | Pyrites | 0 |
| | | Zircon | 5 |
| | | Copper | 0 |
| | | Brass | 10 |
| Binder | 20 | Resin | 7 |
| | | Rubber | 13 |
| | 100 | | 100 |

The modacrylic fibres are, for example, fibres known commercially by the name "CRYLOR" or "VEREL".

EXAMPLE III

The procedure of Example I is followed, but the composition of the friction lining is that given in Table III.

The performances of the lining are analogous to those which have been described in Example I.

TABLE III

| Composition | % | Detail | % |
|---|---|---|---|
| Mineral fibres | 5 | Glass fibres | 0 |
| | | Asbestos fibres | 5 |
| Crosslinkable fusible organic fibres | 35 | Acrylic fibres | 35 |
| | | Modacrylic fibres | 0 |
| Infusible organic fibres | 0 | Staple fibres | 0 |
| Fillers | 40 | Sulphur | 2 |
| | | Carbon black | 3 |
| | | Graphite | 15 |
| | | Barium sulphate | 10 |
| | | Meudon white | 0 |
| | | Pyrites | 0 |
| | | Zircon | 0 |
| | | Copper | 10 |
| | | Brass | 0 |
| Binder | 20 | Resin | 15 |
| | | Rubber | 5 |
| | 100 | | 100 |

I claim:
1. A friction lining containing mineral fibers, organic fibers, fillers and a binder, wherein said organic fibers are all of the initially fusible type but cross-linkable to form a protective crust under the heating conditions of service.

2. A friction lining according to claim 1, wherein the proportion by weight of the organic fibres of the fusible type in the friction lining is between 5% and 40%.

3. A friction lining according to claim 1, wherein the organic fibres of the crosslinkable fusible type are acrylic and/or modacrylic fibres.

4. A friction lining according to claim 1, wherein the lining contains a proportion by weight of 5 to 30% of mineral fibres, 5 to 40% of organic fibres of the fusible type, 30 to 60% of fillers, and 10 to 25% of binder.

5. A friction lining according to claim 1 wherein the mineral fibres are glass and/or asbestos fibres, the fillers totally or partially comprise sulphur, carbon black, graphite, barium sulphate, Meudon white, pyrites, zircon, copper and brass, and the binder totally or partially comprises resin and rubber.

* * * * *